United States Patent
Wang et al.

(10) Patent No.: US 10,747,577 B2
(45) Date of Patent: Aug. 18, 2020

(54) PERFORMANCE CHARACTERIZATION FOR DATACENTERS

(71) Applicant: Nicira, Inc., Palo Alto, CA (US)

(72) Inventors: Dexiang Wang, San Jose, CA (US); Bin Qian, San Jose, CA (US); Jinqiang Yang, Santa Clara, CA (US); Naga S. S. Kishore Kankipati, Fremont, CA (US); Sanal Pillai, Sunnyvale, CA (US); Sujatha Sundararaman, San Jose, CA (US); Ganesan Chandrashekhar, Campbell, CA (US); Rishi Mehta, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 166 days.

(21) Appl. No.: 16/112,696

(22) Filed: Aug. 25, 2018

(65) Prior Publication Data

US 2019/0065265 A1   Feb. 28, 2019

Related U.S. Application Data

(60) Provisional application No. 62/550,617, filed on Aug. 26, 2017.

(51) Int. Cl.
| | |
|---|---|
| *G06F 9/46* | (2006.01) |
| *G06F 9/50* | (2006.01) |
| *G06F 9/455* | (2018.01) |
| *H04L 12/24* | (2006.01) |
| *H04L 12/26* | (2006.01) |

(52) U.S. Cl.
CPC ........ *G06F 9/5011* (2013.01); *G06F 9/45558* (2013.01); *G06F 9/5072* (2013.01); *H04L 41/0896* (2013.01); *H04L 43/0817* (2013.01); *H04L 43/0888* (2013.01); *H04L 43/0894* (2013.01); *H04L 43/50* (2013.01); *G06F 2009/45591* (2013.01); *G06F 2009/45595* (2013.01); *G06F 2209/508* (2013.01)

(58) Field of Classification Search
CPC .. G06F 9/5011; G06F 9/45558; G06F 9/5072; H04L 43/0896; H04L 43/0817; H04L 43/0888; H04L 43/08794; H04L 43/0894
See application file for complete search history.

(56) References Cited

U.S. PATENT DOCUMENTS

| | | | |
|---|---|---|---|
| 9,667,545 B2 * | 5/2017 | Xu | H04L 47/10 |
| 2008/0235352 A1 * | 9/2008 | Yolleck | H04L 67/34 |
| | | | 709/219 |

* cited by examiner

*Primary Examiner* — Camquy Truong
(74) *Attorney, Agent, or Firm* — Loza & Loza, LLP

(57) ABSTRACT

Computer system and method for characterizing throughput performance of a datacenter utilize bandwidth information of physical network interfaces in the datacenter and results of benchmark testing on throughput on a single processor core to compute a plurality of throughput constraints that define a throughput capacity region for the datacenter to improve throughput performance of the datacenter.

20 Claims, 9 Drawing Sheets

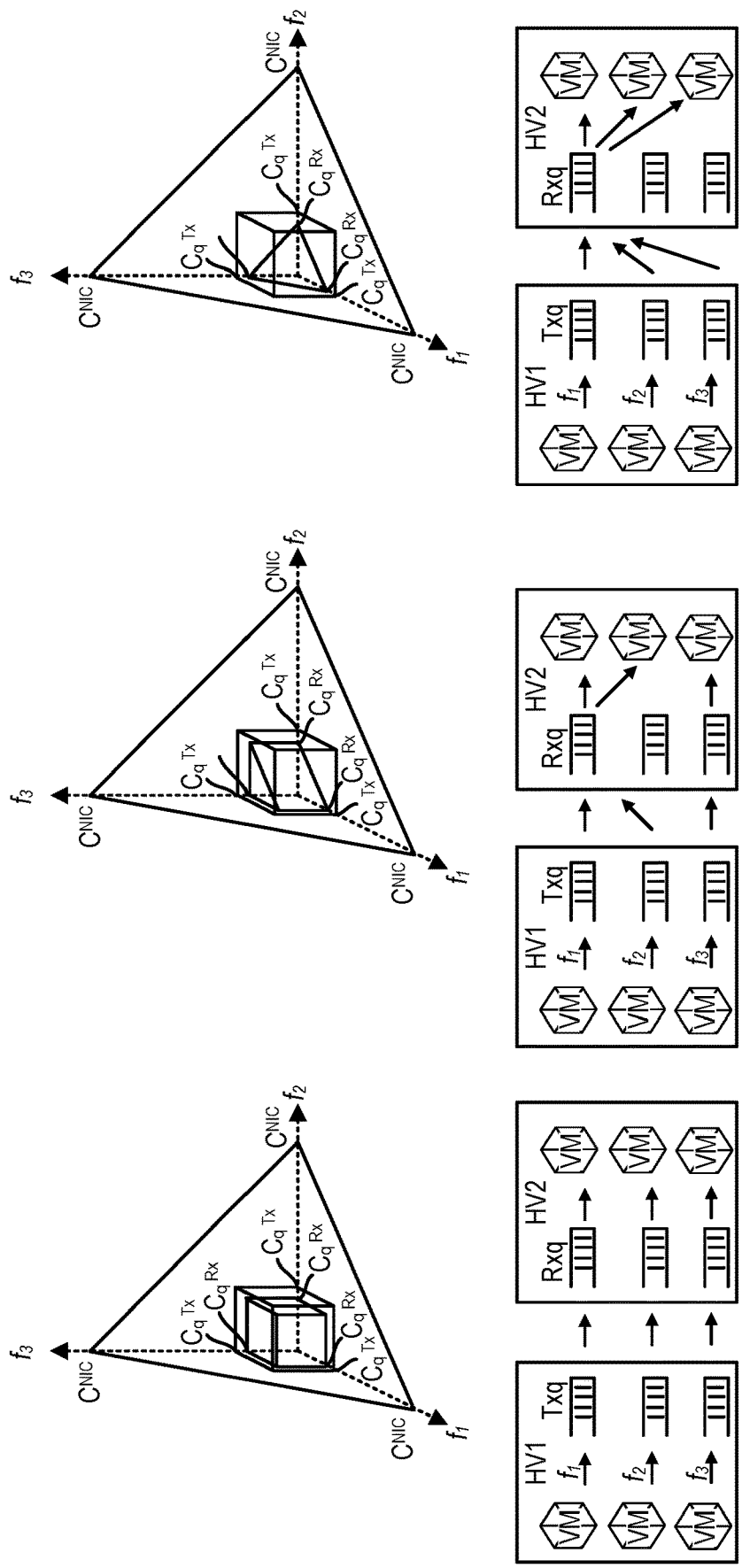

PERFORMANCE CHARACTERIZATION FOR DATACENTERS

CROSS-REFERENCE TO RELATED APPLICATION(S)

This application claims the benefit of U.S. Provisional Patent Application No. 62/550,617, filed Aug. 26, 2017, the entire contents of which are incorporated by reference herein.

BACKGROUND

Virtualization is the process of creating a software-based (or virtual) representation of something rather than a physical one. Virtualization can apply to applications, servers, storage, and networks and is the single most effective way to reduce Information Technology (IT) expenses while boosting efficiency and agility for all size businesses. Virtualized networks, such as secured software-defined data centers (SDDCs), abstract networking from the underlying hardware and may attach networking and security policies to their associated workloads. With virtualized networks, applications and data can reside and be accessible anywhere.

Data-path performance of virtualized networks with respect to communications between virtualized entities within the virtualized networks, e.g., virtual machines (VMs), is an important aspect for users of the virtualized networks. Such data-path performance depends not only on the underlying hardware components of the virtualized networks, but also on software processes that are handling various aspects of the communications within the virtualized networks, including encryption and decryption processes to provide secure environment for secured SDDCs. Some of these software processes may have settings or options, which may affect the data-path performance of virtualized networks.

SUMMARY

Computer system and method for characterizing throughput performance of a datacenter utilize bandwidth information of physical network interfaces in the datacenter and results of benchmark testing on throughput on a single processor core to compute a plurality of throughput constraints that define a throughput capacity region for the datacenter to improve throughput performance of the datacenter.

A method for characterizing throughput performance of a datacenter having a plurality of host computers connected to a physical network in accordance with an embodiment of the invention comprises retrieving bandwidth information of physical network interfaces in the datacenter, executing benchmark testing on the datacenter to determine a processor processable throughput on a single processor core for data traffic between virtual processing instances in the datacenter, computing a plurality of throughput constraints that define a throughput capacity region for the datacenter using the bandwidth information of the physical network interfaces and the determined processor processable throughput on the single processor core, and adjusting resource allocation schemes in the datacenter to modify the throughput capacity region for the datacenter to improve throughput performance of the datacenter. In some embodiments, the steps of this method are performed when program instructions contained in a transitory computer-readable storage medium is executed by one or more processors.

A computer system in accordance with an embodiment of the invention comprises memory and a processor. The processor is configured to retrieve bandwidth information of physical network interfaces in a datacenter, execute benchmark testing on the datacenter to determine a processor processable throughput on a single processor core for data traffic between virtual processing instances in the datacenter, compute a plurality of throughput constraints that define a throughput capacity region for the datacenter using the bandwidth information of the physical network interfaces and the determined processor processable throughput on the single processor core, and adjust resource allocation schemes in the datacenter to modify the throughput capacity region for the datacenter to improve throughput performance of the datacenter.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 4(a)-4(c) illustrate cases that flows $f_1$, $f_2$ and $f_3$ are hash-balanced to transmit (Tx) queues but lose their balanced hashing to receive (Rx) queues to different degrees in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
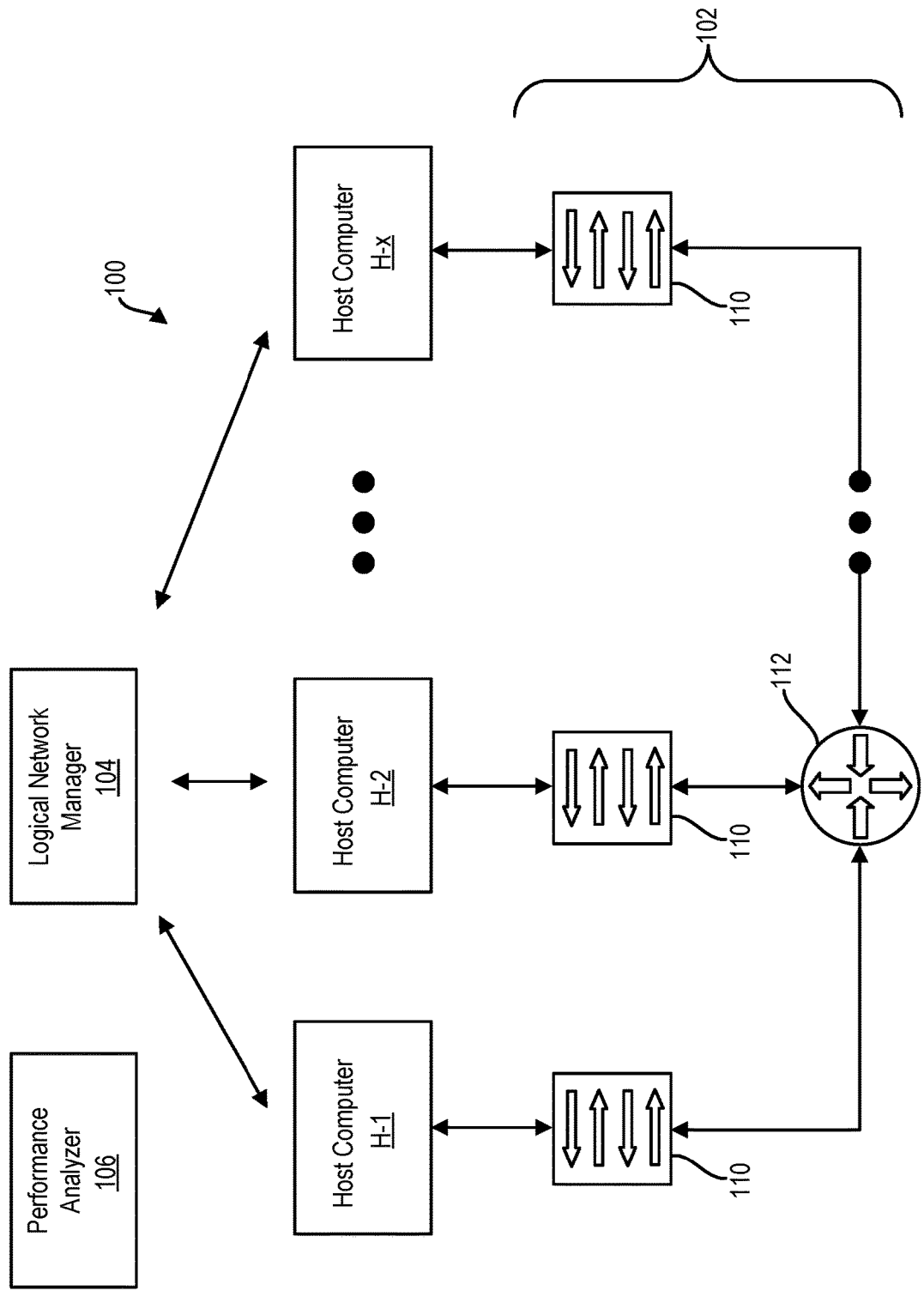
FIG. 1 is a block diagram of a datacenter in accordance with an embodiment of the invention.

Turning now to FIG. 1, a datacenter 100 in accordance with an embodiment of the invention is shown. As depicted in FIG. 1, the datacenter 100 includes a number of host computers H-1, H-2 . . . H-x (where x is a positive integer), a physical network 102, a logical network manager 104 and a performance analyzer 106. The host computers (sometimes referred to herein as "hosts") are connected to each other via the physical network, and thus, communications between the host computers are routed through the physical network, which may comprise multiple subnets. The host computers are also connected to the logical network manager, which supports logical overlay networks connecting virtual machines or other virtual processing instances (not shown). The logical network manager may be connected to hosts H-1, H-2, etc. via physical network 102 or via a separate physical "management" network (not shown).

The host computers H-1, H-2 . . . H-x of the datacenter 100 are physical computer systems that are used to support or host multiple virtual processing instances (not shown) that can execute various applications. As used herein, the term "virtual processing instance" is any software entity that can run on a computer system, such as a software application, a software process, a virtual machine (VM) and a "container" that provides system-level process isolation, e.g., a Docker container. The host computers may be servers that are commonly found in datacenters. As an example, the host computers may be servers installed on different server racks.

Figure 2:
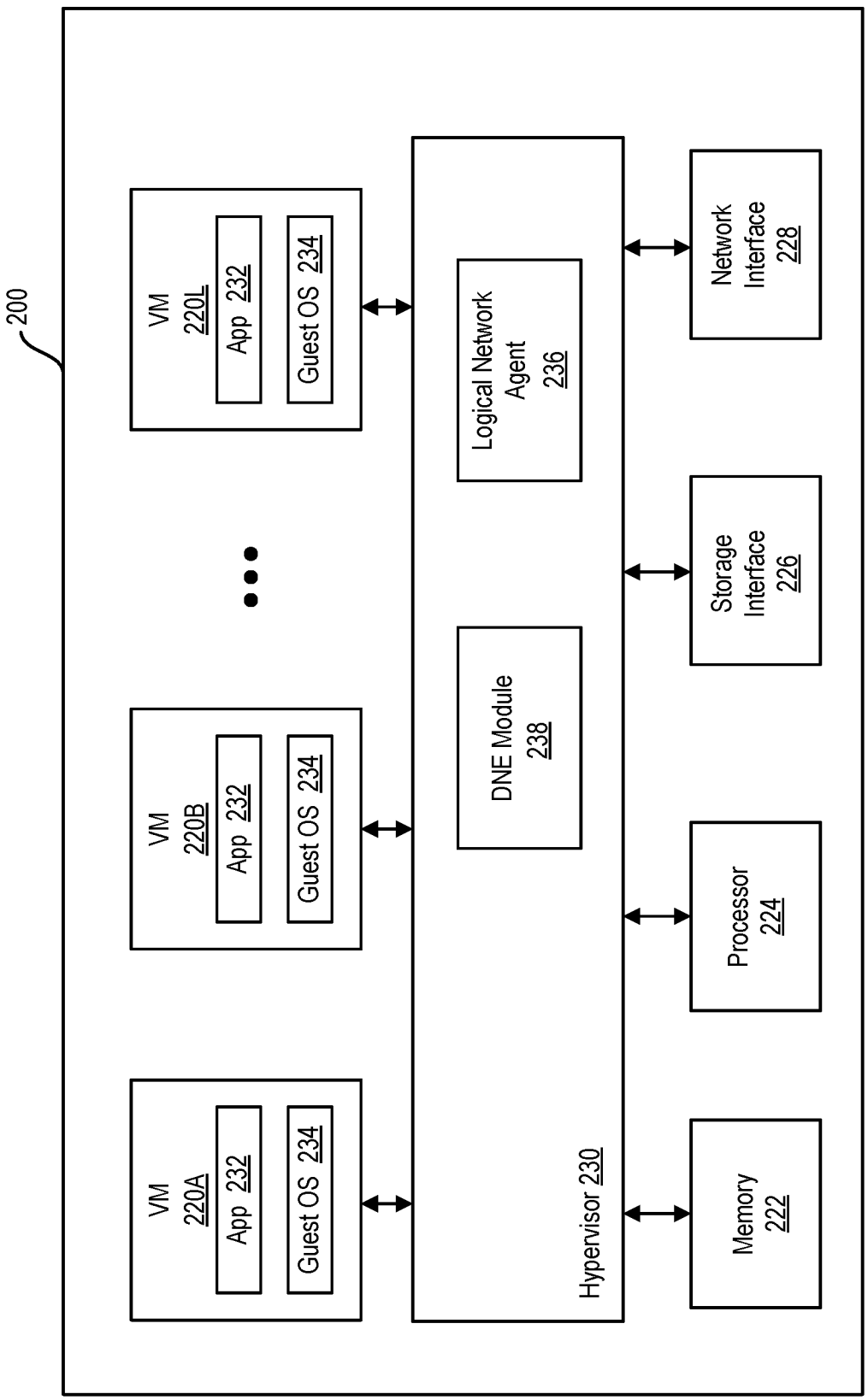
FIG. 2 is a block diagram of a host computer in accordance with an embodiment of the invention.

Turning now to FIG. 2, components of a host computer 200 that is representative of the host computers H-1, H-2 . . . H-x in accordance with an embodiment of the invention are shown. In FIG. 2, the physical connections between the various components of the host computer are not illustrated. In the illustrated embodiment, the host computer is configured to support a number of virtual processing instances ("VMs") 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with storage, which can be any kind of storage, such as locally attached disks or solid-state devices (SSDs), a network-attached storage (NAS), a storage area network (SAN) or a virtual (distributed) SAN (VSAN). As an example, the storage interface may be a host bus adapter or a network file system interface. The network interface 228 is an interface that allows the host computer to communicate with other devices connected to the network 102. As an example, the network interface may be a network adapter, such as a physical network interface card or PNIC.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by hypervisor 230, and, among other things, guest operating system 234 forms a software platform on top of which guest applications 234 run.

In the illustrated embodiment, the hypervisor 230 includes a logical network agent 236, which operates to provide logical networking capabilities, also referred to as "software defined networking" (SDN). Each logical network may include software managed and implemented network services, such as bridging, L3 routing, L2 switching, NAT, and firewall capabilities, to support the logical overlay network 108 illustrated in FIG. 1. The logical network agent 236 comprises a plurality of virtual ports, each connected to either one virtual NIC associated with a corresponding VM or other computing instance or to physical network interface 228. Logical network agent 236 receives configuration information from logical network manager (which may include a control plane cluster) and, based on this information, populates forwarding, firewall and/or other action tables for dropping or directing packets between VMs 220A, 220B, 220L, and other computing instances on other hosts, and/or the outside world via physical network 102 (FIG. 1). Collectively, logical network agent 236, together with other agents on other hosts, according to their forwarding/routing tables, implement isolated overlay networks that can connect arbitrarily selected VMs or other computing instances with each other. Each VM or computing instance may be arbitrarily assigned a particular logical network in a manner that decouples the overlay network topology from the underlying physical network. Generally, this is achieved by encapsulating packets at a source host and decapsulating packets at a destination host so that VMs on the source and destination can communicate without regard to underlying physical network topology. In a particular implementation, the logical network agent 236 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

In the illustrated embodiment, the hypervisor 230 also includes a distributed network encryption (DNE) module 238. The DNE module is configured or programmed to execute encryption/decryption operations for communications from and to select VMs running on the host computer 200. The DNE module provides a DNE data-path functionality having two parts. The first part of functionality is attached to traffic from transmitting VMs before the traffic is overlay-encapsulated (such as STT encapsulated) for transmission via the logical overlay network, where the traffic coming out of the VMs goes through a DNE rule lookup such that an appropriate key policy can be identified to encrypt the traffic. This first part is referred to herein as DNE leaf processing. The second part of functionality is placed after the traffic is overlay-encapsulated and when it is about to be sent out of the host via the network interface 228, e.g., a PNIC. This second part is referred to herein as DNE uplink processing, which involves taking an encryption key generated according to specification of the key policy, and applying the corresponding encryption algorithm to encrypt the traffic before the traffic is sent out of the network interface 228.

Receiver side processing performed by the DNE module 238 is roughly the reverse of sender side processing. The DNE module conducts decryption at the uplink on the received traffic using a key retrieved by looking up a security association database (SADB) with a parametric value (like a security parameter index (SPI)) carried in the packet. The decrypted traffic passes to its destination virtual port, where it goes through another DNE rule lookup to verify whether the key policy that the sending side uses matches the receiving side's expectation. For more information regarding DNE operations, please see U.S. Patent Application Publication Number 2015/0379277 A1, application Ser. No. 14/320,573, titled "Encryption Architecture", which is incorporated herein by reference in its entirety.

Turning back to FIG. 1, the physical network 102 can be any type of computer network or a combination of networks that allows communications between devices connected to the network. The physical network 102 may include the Internet, a wide area network (WAN), a local area network (LAN), a storage area network (SAN). As illustrated in FIG. 1, the physical network 102 may include switches 110, one or more routers 112 and other physical networking components (not shown).

The logical network manager 104 of the datacenter 100 operates to manage and control the logical overlay network 108 in the datacenter. In an embodiment, the logical network manager has access to information regarding physical components in the datacenter, such as the host computers H-1, H-2 . . . H-x, the physical network topology or connectivity between hosts, and logical networks, their services, topologies, and connectivity. With the physical and logical network information, the logical network manager is able to map logical network topologies and configurations for implementation on physical network components that convey, route, and filter physical traffic for the overlay networks. Logical network manager may include a manager component (e.g., a server) that receives configurations from a user via a web-based interface or command-line interface, or from an orchestration component (not shown) via an exposed API. Logical network manager may also include a control plane (not separately shown) that may comprise a cluster of control computers that share the task of receiving configuration information from the manager component and pushing relevant configuration information to the individual hosts.

The performance analyzer 106 of the datacenter 100 operates to provide information regarding performance characterization of the datacenter, which may be a secured software-defined data center (SDDC). As described in more detail below, the performance analyzer is able to precisely define boundaries of a performance capacity region for the datacenter using a mathematical model. This performance capacity region, which is referred to herein simply as a capacity region, is a multi-dimension space defined by all traffic flows that shows the throughput capacity of the datacenter. This can help a user of the datacenter to have a clear picture about what capacity the datacenter is able to achieve, given the hardware investment made in the datacenter, such as number of servers or host computers, number of CPU cores on each server, physical NIC/NIC bandwidth and bandwidth provision of the physical network. In an embodiment, the derived capacity region may be used to compute an effective capacity, which is a metric to evaluate performance of different capacity regions. The effective capacity of a datacenter indicates the balance of the datacenter with respect to throughput. The capacity region and/or the effective capacity for the datacenter may be used to provide recommendations to achieve a better capacity region, for example, a more balanced capacity region or even a better shaped/sized capacity region corresponding to specific performance needs for the datacenter. It is noted here that often times, a balanced capacity region is desired to help flows to scale evenly and not to be skewed in some directions than others.

Figure 3:
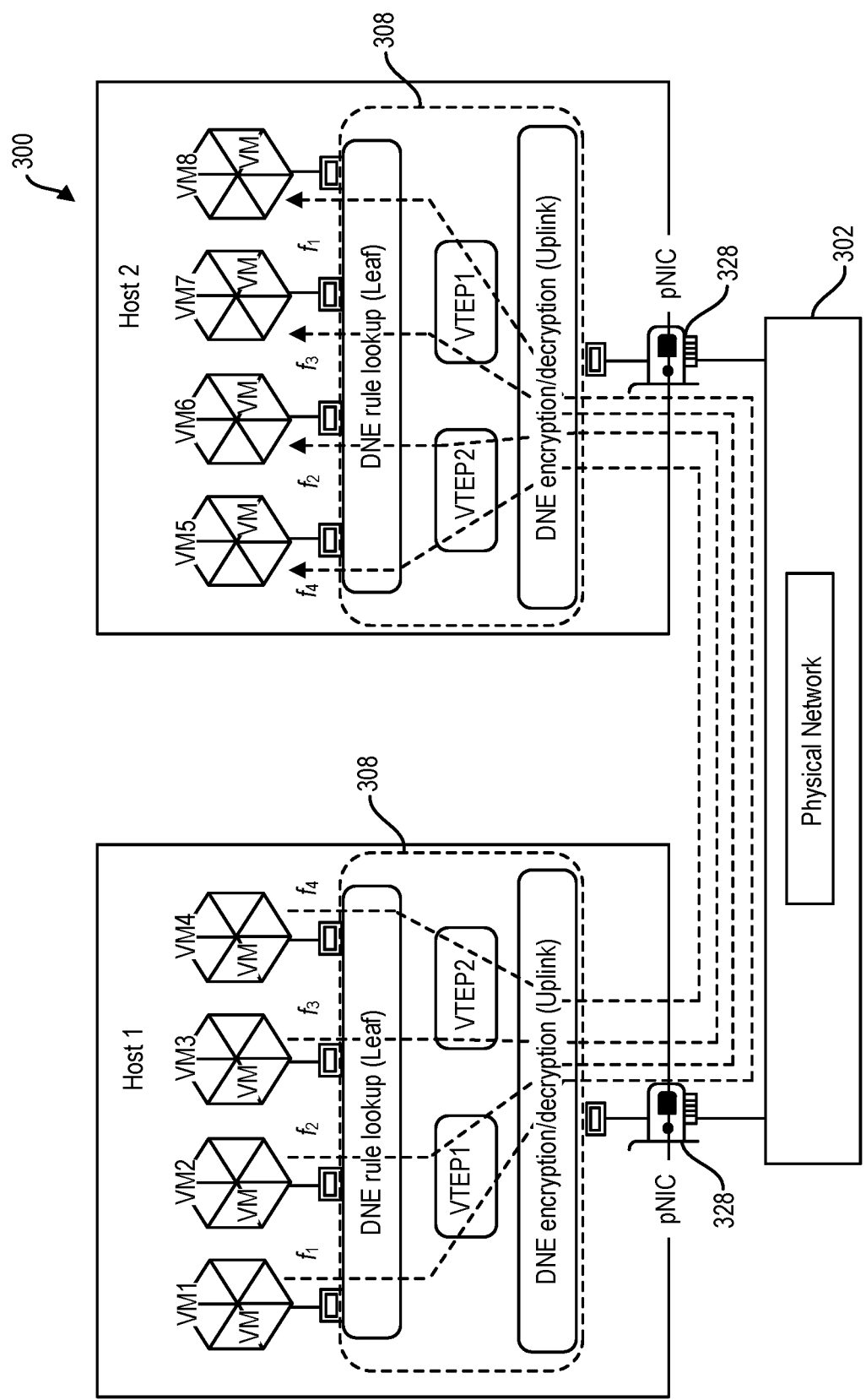
FIG. 3 is a test setup for two host computers in accordance with an embodiment of the invention.

The performance modeling scheme implemented by the performance analyzer 106 is based on work done in building a security infrastructure on top of the logical network provided by a logical network manager to secure communications between VMs across a potentially untrusted physical network. The work started with implementation of DNE encryption using a pure software-based crypto utility. Performance tests were based on a test setup 300 shown in FIG. 3, in which two host computers (i.e., Host 1 and Host 2) are connected to a physical network 302 through 10G PNICs 328. A virtual switch 308 is deployed in each of the two hosts. Four VMs on each host are spawned and attached to the virtual switches. The four VMs (i.e., VM1, VM2, VM3 and VM4) on Host 1 can initiate four test flows f1, f2, f3 and f4 generated by a performance test tool, such as an iPerf tool, to the four other VMs (i.e., VM5, VM6, VM7 and VM8) on Host 2. The test flows travels through two VTEPS (i.e., VTEP1 and VTEP2) on Host 1 and two VTEPS (i.e., VTEP3 and VTEP4) on Host 4. In FIG. 3, the encryption/decryption operations in each host are illustrated as DNE rule lookup processing and DNE encryption/description processing.

For a single Transmission Control Protocol (TCP) flow from one transmitting VM on Host 1 to another VM on Host 2 as shown in FIG. 3, the DNE throughput was observed to be 0.5 Gbps. Later, Advanced Encryption Standard (AES) New Instructions (NI), or AES-NI, and GHASH Assembly (ASM) acceleration was implemented into the crypto utility. With that, the throughput for the single-flow test case was increased to 2.1 Gbps. This indicated that crypto computation efficiency is a critical factor for data-path performance.

In addition, the DNE data-path code was optimized by extracting out common operations on packets that belong to the same flow and conducting one-time flow-level processing, such that the amortized per-packet processing cost can be significantly reduced. For example, by abstracting a crypto context and associating it with the corresponding key policy, the effort of establishing the crypto environment for each packet, as traditional implementation does, can be saved. This saving is converted to extra throughput improvement from 2.1 Gbps to 2.5 Gbps, which is about 20% improvement.

In building the security infrastructure, two performance bounds for DNE flows were identified, which quantify hard limits that DNE throughput may not surpass. The first bound is determined by the throughput of pure CPU-bound crypto computation, due to the fact that the crypto computation is an integral part of the data-path processing cost for a DNE flow. Due to the symmetric nature of the Advanced Encryption Standard (AES)—Galois/Counter Mode of Operation (GCM) algorithm, it is observed that both encryption and decryption (AES-NI accelerated) lead to the same throughput at 5.6 Gbps. This bound becomes specifically meaningful when we discuss DNE CPU utilization in the next section. The second bound is obtained by only considering regular virtual switch data-path processing cost without DNE processing involved. When maximum transmission unit (MTU) size 1600 is used, it is observed that 7.8 Gbps can be reached. MTU size refers to the largest data packet that can be transmitted.

In addition, other interesting factors for DNE flows were observed, such as CPU load profile and MTU size impact. CPU profiling results on both transmit (Tx) and receive (Rx) sides for the single-flow test case that leads to 2.5 Gbps throughput are shown below in Table 1.

TABLE 1

| Tx (CPU 85%) | | Rx (CPU 100%) | |
|---|---|---|---|
| NSX Tx processing | 8% | NSX Rx processing | 29% |
| DNE encryption | 42% | DNE decryption | 42% |
| DNE Tx rule lookup | 4% | DNE Rx rule lookup | 4% |
| DNE pkt segmentation | 8% | DNE SPI lookup | 3% |
| DNE pkt Tx duplication | 10% | DNE pkt Rx duplication | 7% |
| DNE seqnum assignment | 3% | DNE anti-replay check | 4% |
| Other DNE Tx processing | 10% | Other DNE Rx processing | 11% |

The first observation is that DNE performance is throttled by Rx processing since Rx side CPU is 100% occupied. (Tx side CPU is 85% utilized.) This asymmetric CPU consumption roots mainly from the fact that the data-path processes on Tx side and on Rx side see packets of different sizes. The packets flowing on the Tx side are present in larger sizes than those flowing on the Rx side. Since regular data-path processing cost is per-packet-based and hence is proportional to the number of packets to be processed, larger CPU load is seen on Rx side than on Tx side. Such difference can be observed by comparing CPU load on "NSX Tx/Rx processing" (8% V.S. 29%) in Table. 1.

The second observation is that encryption and decryption consume CPU the most (42%), which again indicates crypto efficiency is a critical factor in determining DNE performance. As noted above, pure CPU-bound crypto throughput is 5.6 Gbps by running with 100% CPU. 42% CPU delivers around 2.35 Gbps crypto throughput, which makes close connection to 2.5 Gbps flow throughput, considering various sources of errors.

Other observations are as follows. On Tx side, due to simplicity of rule setting, the DNE rule lookup only takes 4% of CPU. In addition, TCP segmentation takes 8% of CPU. Also, 10% of CPU is taken by packet duplication and stretching. Duplication is to ensure that the original packet remains intact. Stretching is to make additional buffer room to hold extra fields generated for ESP encapsulation that DNE currently takes. Lastly, 3% of CPU is utilized to generate a sequence number for each DNE-policed packet. On Rx side, DNE rule lookup cost is similar to its Tx side counterpart. 3% of CPU is taken by SPI lookup to find a proper key to decrypt the packets. 7% of CPU is used for Rx side packet duplication. Anti-replay check takes 4% of CPU to determine whether a received packet is a replay copy of the original one.

Impact of MTU size for the single-flow test case is illustrated below in Table 2.

TABLE 2

| MTU = 1600 (Tx CPU 85%) | | MTU = 9000 (Tx CPU 100%) | |
|---|---|---|---|
| NSX Tx processing | 8% | NSX Tx processing | 11% |
| DNE encryption | 42% | DNE encryption | 59% |
| DNE Tx rule lookup | 4% | DNE Tx rule lookup | 6% |
| DNE pkt segmentation | 8% | DNE pkt segmentation | 6% |
| DNE pkt Tx duplication | 10% | DNE pkt Tx duplication | 7% |
| DNE seqnum assignment | 3% | DNE seqnum assignment | 1% |
| Other DNE Tx processing | 10% | Other DNE Rx processing | 10% |

When raising MTU size at PNIC from 1600 to 9000, it was observed that the flow throughput was raised from 2.5 Gbps to 4.4 Gbps. With CPU profiling, it was observed that Tx side and Rx side show similar CPU utilization (close to 100%). This is because the PNIC level MTU constraint is greatly relieved. This is illustrated in the above table, which compares CPU utilization between MTU sizes 1600 and 9000 on Tx side specifically.

As shown in Table 2, more CPU (59%) is allocated for encryption in case of MTU=9000, which directly leads to the throughput improvement. This is in part because of the 15% idle CPU on Tx side can be fully leveraged for the case of MTU=1600.

CPU load of some data-path processing components is per-packet based and hence is proportional to number of packets being processed. Examples are regular NSX datapath processing functions and DNE rule lookup. CPU load of other data-path processing components is proportional to the amount of data carried in the flow. Examples are DNE encryption and decryption. Besides, CPU load on packet segmentation depends on MTU size. Thus, as shown in Table 2, the segmentation load drops from 8% to 6% even though a higher rate of traffic (4.4 Gbps) is handled when MTU size increases to 9000.

Since virtual networks support multiple flows, which typically involves flow-level concurrent processing, parallel mechanisms on both Tx and Rx sides need to be explored. On Tx side, a data-path process is created for each transmitting VM. However, each process does not necessarily get mapped exclusively to a CPU core. If two VMs are mapped to the same Tx queue, their corresponding data-path processes have to share the same CPU core that is associated with the Tx queue. On Rx side, when receive side scaling (RSS) is enabled on the receiving PNIC, received traffic gets hashed to different Rx queues. Each Rx queue is processed by an Rx data-path process on a dedicated CPU core.

Thus, the parallel processing mechanism is different on Tx side and Rx side. Tx side is VM-hashing-based while Rx side is RSS hashing based. On both Tx side and Rx side, there is possibility for different flows to be processed by the same CPU core, depending on how the flows are mapped to CPU cores.

DNE encryption starts from the outer TCP header of the STT-encapsulated packet. As a result, the receiving PNIC can only extract source and destination internet protocol (IP) addresses (VTEP IP addresses) in the outer IP header to form a key for RSS hashing. If only one VTEP IP address is configured on each host, all flows in FIG. 3 will take the same source and destination VTEP IP addresses and get hashed to the same Rx queue. The throughput of all four flows will be limited by the processing capacity of a single CPU core. To resolve this limitation, two VTEP IP addresses may be configured on each host and associate VTEP IP addresses to VMs in such a way that the four flows can take different source and destination VTEP IP address combinations, as shown in FIG. 3. In this example, four VTEP IP addresses are purposely selected such that the four flows are hashed to four different Rx queues, in order to fully test multi-core processing potential. Similar care is taken on Tx side such that the four flows are mapped to four different Tx queues. Now, the four flows are processed by four different CPU cores on both Tx and Rx sides.

Aggregate throughput for various number of flows is illustrated below in Table 3. As show in Table 3, the aggregate throughput grows in a close-to-linear fashion, with certain degradation on individual flows.

TABLE 3

|  | 1 flow | 2 flows | 3 flows | 4 flows |
| --- | --- | --- | --- | --- |
| Aggregate throughput | 2.5 Gbps | 4.5 Gbps | 6.3 Gbps | 8 Gbps |

Impact of number of flows (MTU=1600) is illustrated below in Table 4, which compares Rx CPU utilization of the same flow between running it alone and running it concurrently with other three flows. Table 4 shows that CPU taken by DNE decryption reduces from 42% to 37%. This directly leads to throughput drop. In contrast, other portions of DNE processing costs get slightly increased, such as SPI table lookup, anti-replay check, etc. The major cause for such a result is the locking cost spent on a set of common software constructs (like SPI table, key policy table, anti-replay context table, etc.) accessed by concurrent processes.

TABLE 4

| flow (Rx CPU 100%) | | 4 flows (Rx CPU 100%) | |
| --- | --- | --- | --- |
| NSX Rx processing | 29% | NSX Rx processing | 26% |
| DNE decryption | 42% | DNE decryption | 37% |
| DNE Rx rule lookup | 4% | DNE Rx rule lookup | 2% |
| DNE SPI lookup | 3% | DNE SPI lookup | 7% |
| DNE pkt Rx duplication | 7% | DNE pkt Rx duplication | 7% |
| DNE anti-replay check | 4% | DNE anti-replay check | 6% |
| Other DNE Rx processing | 11% | Other DNE Rx processing | 15% |

Using the observations described above, data-path throughput can be characterized using a mathematical model. Throughput modeling of a single flow will be first considered, before moving to throughput modeling of all flows in a virtualized network, e.g., a secured SDDC.

From the transmitting VM to the receiving VM, a flow experiences a sequence of processing components along its path: Tx data-path processing (in CPU), Tx PNIC processing, physical network processing, Rx PNIC processing, and Rx data-path processing (in CPU). The whole process can be viewed as a pipeline chain. The throughput of the flow is determined by the bottleneck bandwidth of those processing components and can be expressed as:

$$T_{flow} = \min_{k \in K} C_k, \quad (1)$$

where K={Tx-CPU, Tx-NIC, Phy-Network, Rx-NIC, Rx-CPU}K. $C_k$ represents the bandwidth achievable at component k. In light of test results shown previously, the bottleneck bandwidth is at Rx data-path processing, which is 2.5 Gbps.

The capacity of a PNIC on Tx side and on Rx side is constant, such as 10 Gbps. For simplicity of discussion, it is assumed that the bandwidth provision by the physical network is sufficient. The focus of this discussion is on the processing capacity of the CPU core. For an example of Tx processing, throughput induced by a Tx core can be expressed as:

$$C_{Tx-CPU} = \frac{\sum_{p \in F} s_p}{\sum_{p \in F} t_p}. \quad (2)$$

Here, $s_p$ represents the size of packet p in flow F, and $t_p$ represents the processing time of the packet p on a Tx CPU core.

If the packets in flow F share the same size $s_{pkt}$ and have the same processing time $t_{pkt}$, $C_{Tx-CPU}$ can be simplified as:

$$C_{Tx-CPU} = \frac{1}{t_{pkt}} \times s_{pkt}. \quad (3)$$

When DNE processing is involved, the packet processing time $t_{pkt}$ can be decomposed as follows:

$$t_{pkt} = t_{per-pkt} + t_{encryption}, \quad (4)$$

where $t_{per-pkt}$ is per-packet processing time, which is independent of packet size, and $t_{encryption}$ is time spent on encryption, which is proportional to the packet size. The term $t_{per-pkt}$ can be further broken down as follows $$t_{per-pkt} = t_{NSX-datapath} + t_{DNE-leaf} + t_{DNE-uplink}, \quad (5)$$

where $t_{NSX-datapath}$ is regular NSX data-path processing time, and $t_{DNE-leaf}$ and $t_{DNE-uplink}$ are DNE processing times on leaf and uplink sides (per-packet part).

The other term $t_{encryption}$ in equation (4) can be formulated by the product of per-bit encryption time $t_{per-bit}$ and packet size $s_{pkt}$ as follows:

$$t_{encryption} = t_{per-bit} \times s_{pkt} \quad (6)$$

where $t_{per-bit}$ is per-bit processing time.

Following a similar process, Rx-side throughput $C_{Rx-CPU}$ can also be modeled.

When flows run concurrently, the essential additional factors that need to be considered are their contention on resources. Two major resource contentions are modeled: CPU contention and contention on accessing lock-protected software constructs. The notations used in the mathematical model are listed as follows.

Sets and Indices:
V: the entire set of VMs running in a data center.
i, j ∈ V: VM indices.
H: the entire set of hypervisors in a data center.
h ∈ H: hypervisor index.
$V_h$: the set of VMs running on hypervisor h.
$f_{ij}$: traffic rate of flow from VM i to VM j.
F=[$f_{ij}$], h(i)≠h(j): set of flow rates of cross-hypervisor flows.
$Q_h^{Tx}$, $Q_h^{Rx}$: the sets of Tx queues and Rx queues on hypervisor h.
q: queue index (q ∈ $Q_h^{Tx}$ or q ∈ $Q_h^{Rx}$).
$L^{Tx}$, $L^{Rx}$: the sets of locks on Tx and Rx sides respectively.
l: lock index (l ∈ $L^{Tx}$ or l ∈ $L^{Rx}$).
Hashing or Mapping Functions:
$q^{Tx}$=$Hash^{Tx}$(i): hash function to map traffic sent from VM i to Tx queue $q^{Tx}$.
VTEP(i): VTEP teaming function that maps VM i to VTEP(i).
$q^{Rx}$=$Hash^{Rx}$(VTEP(i), VTEP(j)): RSS hash function to map flow i→j to Rx queue $q^{Rx}$.
Capacity Limiters:
$C_{ij}^{Tx-CPU}$: single-core Tx CPU max processable rate for flow i→j.
$C_{ij}^{Rx-CPU}$: single-core Rx CPU max processable rate for flow i→j.
$C_h^{Tx-NIC}$: Tx-side PNIC bandwidth on hypervisor h.
$C_h^{Rx-NIC}$: Rx-side PNIC bandwidth on hypervisor h.
$C_l^{Tx-Lock}$: Maximum number of packets that can pass the code section protected by lock l on Tx side per second, which equals reciprocal of the time spent on executing the protected code section.
$C_l^{Rx-Lock}$: Maximum number of packets that can pass the code section protected by lock l on Rx side per second.

Following a similar examination order along the pipeline chain between Tx and Rx, how flow throughputs (rates) are regulated in a data center network can be derived through the following inequalities (7)-(12).

First, the rates of flows processed by the same core on Tx side are limited by the processing capability of the core. In other words, summation of CPU shares taken by different flows cannot exceed 100%. Note that the max processable rate $C_{ij}^{Tx-CPU}$ for different flows on the same core may be different due to the difference in flow parameters like packet size, as explained above. This is modeled as follows:

$$\sum_{\substack{i \in V_h, j \in V \setminus V_h \\ q=Hash^{Tx}(i)}} \frac{f_{ij}}{C_{ij}^{Tx-CPU}} \leq 1, \text{ for any } q \in Q_h^{Tx}, h \in H \quad (7)$$

Inequality (7) states that the summation of CPU shares, represented by $$\frac{f_{ij}}{C_{ij}^{Tx-CPU}},$$

by all flows (sourced from VM i and destined to VM j) that are processed by a CPU core on Tx side of hypervisor h is equal to or less than 1, for any Tx queue q (mapped to the CPU core) and any hypervisor h.

Second, the aggregate rate of flows that are sent out of a PNIC cannot exceed the PNIC's Tx bandwidth $C_h^{Tx-NIC}$. This is modeled as follows:

$$\sum_{q \in Q_h^{Tx}} \sum_{\substack{i \in V_h, j \in V \setminus V_h \\ q=Hash^{Tx}(i)}} f_{ij} \leq C_h^{Tx-NIC}, \text{ for any } h \in H \quad (8)$$

Inequality (8) states that the summation, across all Tx queues (mapped to CPU cores), of the rates of all transmitted flows, $f_{ij}$, that are processed and mapped to a Tx queue q, is equal to or less than the bandwidth of the PNIC on the Tx side of any hypervisor h.

Third, the aggregate rate of flows that are received by a PNIC cannot exceed the PNIC's Rx bandwidth $C_h^{Rx-NIC}$. This is modeled as follows:

$$\sum_{q \in Q_h^{Rx}} \sum_{\substack{i \in V \setminus V_h, j \in V_h \\ q=Hash^{Rx}(VTEP(i),VTEP(j))}} f_{ij} \leq C_h^{Rx-NIC}, \text{ for any } h \in H \quad (9)$$

Inequality (9) states that the summation, across all Rx queues (mapped to CPU cores), of the rates of all received flows, $f_{ij}$, that are processed and mapped to a Rx queue q, is equal to or less than the bandwidth of the PNIC on the Rx side of any hypervisor h.

Fourth, the summation of CPU shares taken by different flows processed by the same core on Rx side cannot exceed 100%. This is modeled as follows:

$$\sum_{\substack{i \in V \setminus V_h, j \in V_h \\ q=Hash^{Rx}(VTEP(i),VTEP(j))}} \frac{f_{ij}}{C_{ij}^{Rx-CPU}} \leq 1, \text{ for any } q \in Q_h^{Rx}, h \in H \quad (10)$$

Inequality (10) states that the summation of CPU shares, represented by $$\frac{f_{ij}}{C_{ij}^{Rx-CPU}},$$

by all flows (sourced from VM i and destined to VM j) that are processed by a CPU core on Rx side of hypervisor h is equal to or less than 1, for any Rx queue q (mapped to the CPU core) and any hypervisor h.

In addition, the total number of processable packets (per second) from all flows that access the same lock cannot go beyond $C_l^{Tx-Lock}$ and $C_l^{Rx-Lock}$ on Tx and Rx sides respectively. Here $s_{ij}$ is the packet size of flow $f_{ij}$.

$$\sum_{i \in V_h, j \in V \setminus V_h} \frac{f_{ij}}{s_{ij}} \leq C_l^{Tx-Lock}, \text{ for any } h \in H, l \in L_h^{Tx} \quad (11)$$

Inequality (11) states that the summation of packet rates, represented by $$\frac{f_{ij}}{s_{ij}},$$

of all flows (sourced from VM i and destined to VM j) that are transmitted out of a hypervisor h, is equal to or less than the max number of packets that can pass a code section protected by a lock l, on the Tx side of any hypervisor h.

$$\sum_{i \in V \setminus V_h, j \in V_h} \frac{f_{ij}}{s_{ij}} \le C_l^{Rx-Lock}, \text{ for any } h \in H, l \in L_h^{Rx} \quad (12)$$

Inequality (12) states that the summation of packet rates, represented by $$\frac{f_{ij}}{s_{ij}},$$

of all flows (sourced from VM i and destined to VM j) that are received by a hypervisor h, is equal to or less than the max number of packets that can pass a code section protected by a lock l, on the Rx side of any hypervisor h.

Above constraints collectively confine how far the flows in a datacenter, such as a SDDC, can grow. Note that each constraint actually defines a hyperplane in a multi-dimension space defined by all flows. The rates of flows are regulated to stay on one side of the hyperplane. Thereby the set of constraints essentially define a convex polyhedron, which is referred to herein as a capacity region, denoted by Ω. The boundary of the capacity region tells the max achievable system throughput.

Figure 5A:
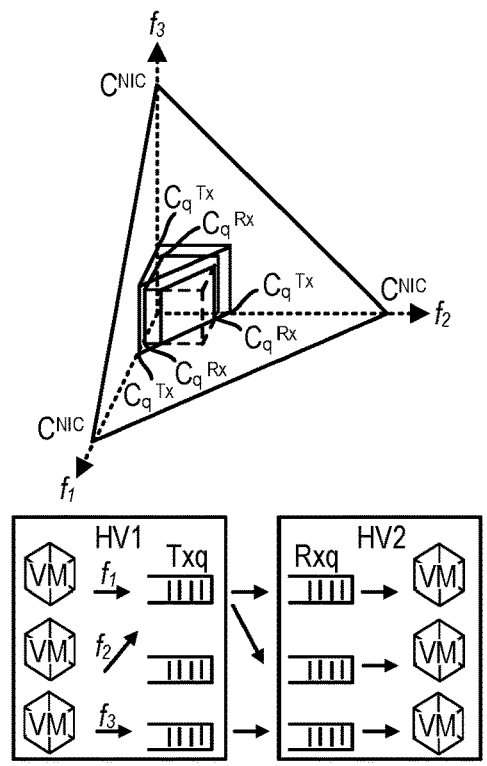
FIGS. 5(a)-5(d) illustrate where two flows collide on the same Tx queue with various queue hashing cases on the Rx side in accordance with an embodiment of the invention.
Figure 5B:
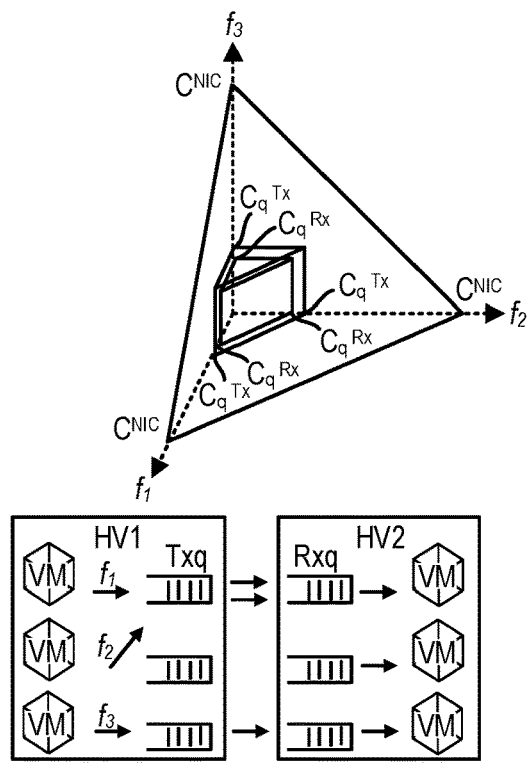
Figure 5C:
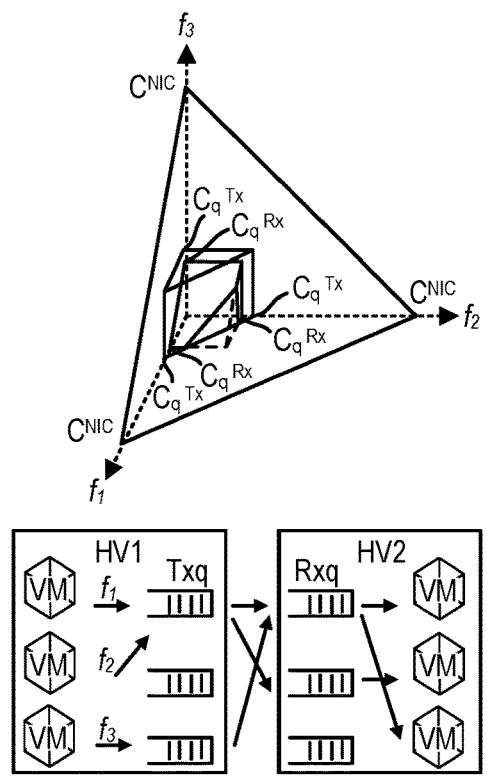
Figure 5D:
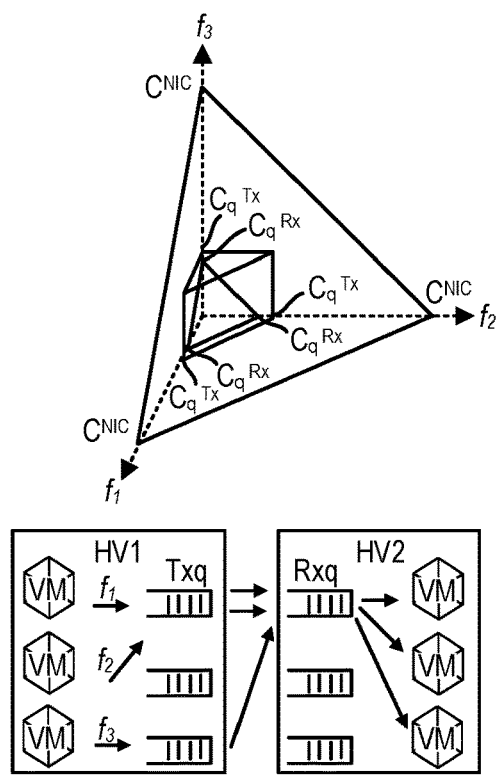
Figure 6C:
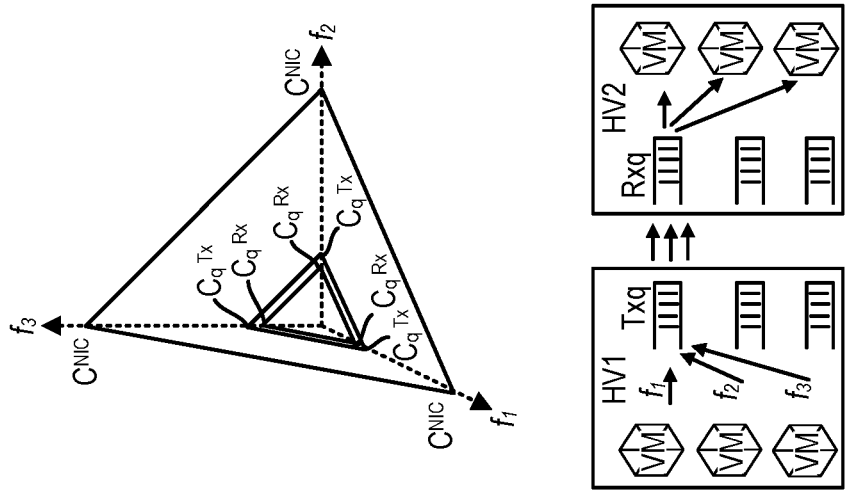
FIGS. 6(a)-6(c) illustrate cases where the worst queue hashing happens on the Tx side with various queue hashing cases on the Rx side in accordance with an embodiment of the invention.
Figure 6B:
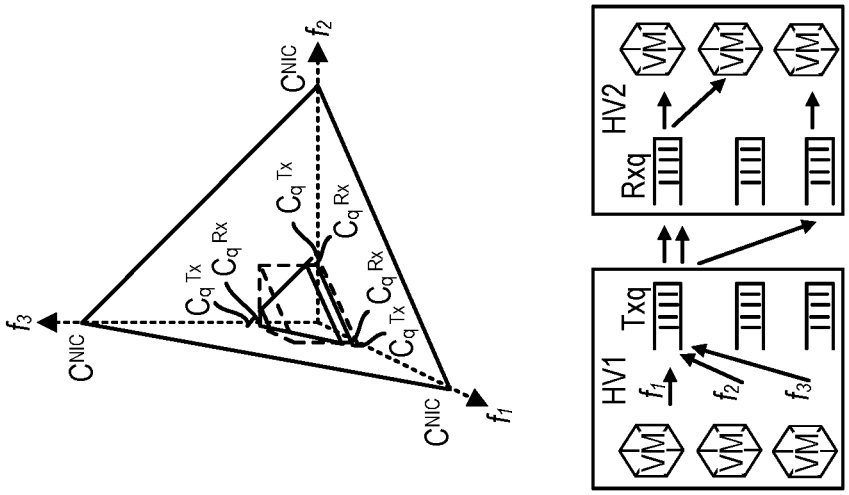
Figure 6A:
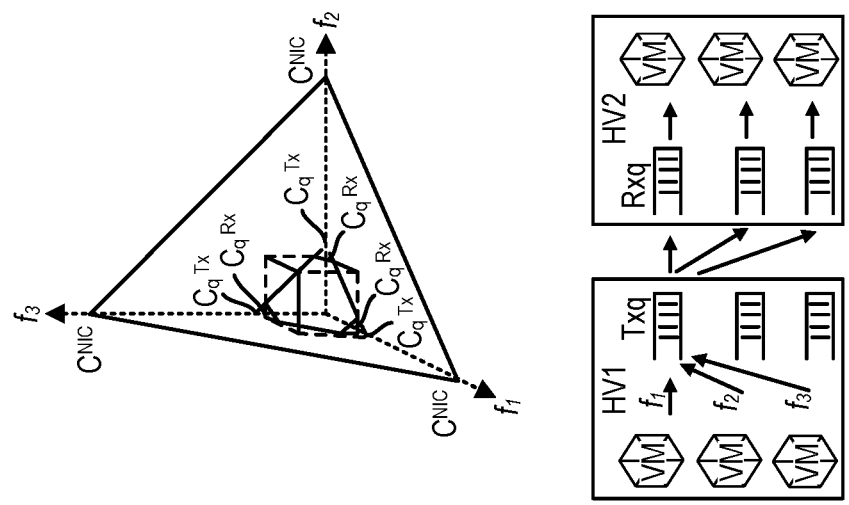

An example setup where three flows run from one hypervisor to another may be used to help visually understand the capacity region. Three Tx queues are available on Tx side hypervisor and three Rx queues are present on Rx side hypervisor. Various flow hashing cases are illustrated in FIGS. 4-6. FIGS. 4(a)-4(c) demonstrate cases that flows $f_1$, $f_2$ and $f_3$ are hash-balanced to Tx queues but lose their balanced hashing to Rx queues to different degrees. FIG. 4(a) shows a case where the flows $f_1$, $f_2$ and $f_3$ are hash-balanced to Rx queues. FIG. 4(b) shows a case where two flows $f_1$ and $f_2$ are sent to one Rx queue. FIG. 4(c) shows a case where all three flows are sent to one Rx queue. It can be observed that in the 3-D demonstration how the corresponding capacity region (indicated by the smallest region) shrinks. Note that in the demonstration, the CPU core processing throughput $C_q^{Tx}$, $C_q^{Rx}$, and PNIC capacity $C^{NIC}$ are applied proportional to what was observed in the performance testing. Due to asymmetric CPU utilization between Tx and Rx, the capacity boundary regulated on the Tx side shows larger than on the Rx side. FIGS. 5(a)-5(d) show cases where two flows collide on the same Tx queue with various queue hashing cases on the Rx side. FIG. 5(a) shows a case where the flows are hash-balanced to Rx queues. FIG. 5(b) shows a case where two flows $f_1$ and $f_2$ are sent to one Rx queue. FIG. 5(c) shows another case where two flows $f_1$ and $f_3$ are sent to one Rx queue. Note that in FIG. 5(b) and FIG. 5(c), although two flows collide on the same Rx queue, the two cases end up with capacity regions with different shapes due to the difference in the way the flows collide. FIG. 5(d) shows a case where all three flows are sent to one Rx queue. FIGS. 6(a)-6(c) show cases where the worst queue hashing happens on the Tx side with various queue hashing cases on the Rx side. FIG. 6(a) shows a case where the three flows collide on the same Tx queue, but the flows are hash-balanced to Rx queues. FIG. 6(b) shows a case where the three flows collide on the same Tx queue, but two of the flows $f_1$ and $f_2$ are sent to one Rx queue. FIG. 6(c) shows a case where the three flows collide on the same Tx queue, and all three flows are sent to one Rx queue.

Figure 7:
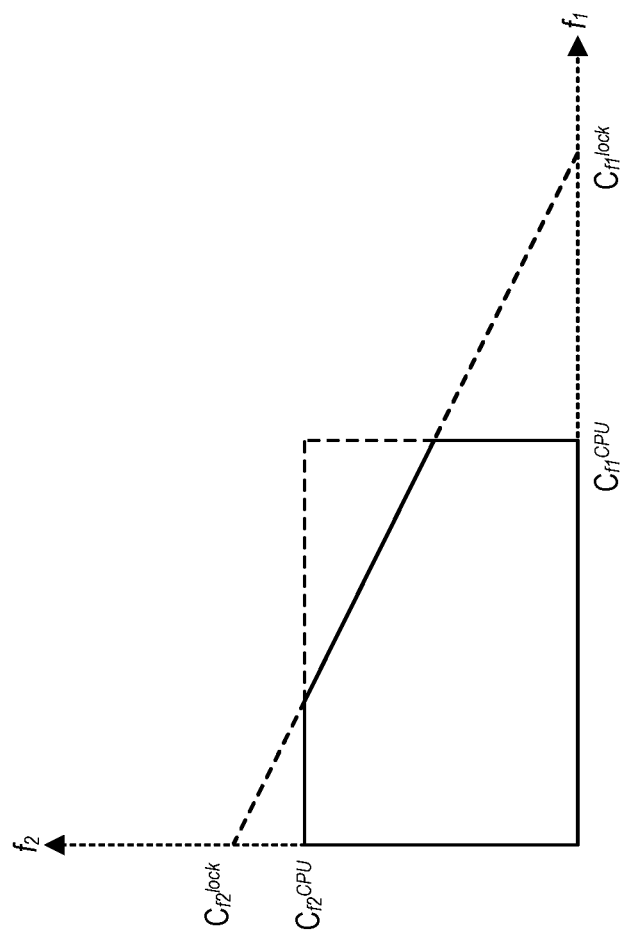
FIG. 7 illustrates locking impact on flow throughput, where two flows run on different cores and access the same lock in accordance with an embodiment of the invention.

Locking impact on flow throughput is demonstrated in FIG. 7, where two flows run on different cores and access the same lock. Throughputs $C_{f_1}^{CPU}$ and $C_{f_2}^{CPU}$ are CPU-processable throughputs of flows $f_1$ and $f_2$ if they run without need to contend on the lock. $C_{f_1}^{Lock}$ and $C_{f_2}^{Lock}$ are max throughputs of flows $f_1$ and $f_2$ if they only run through the code section protected by the lock. The triangle area cut out at the up-right corner represents the throughput loss caused by the lock.

The aggregate throughput of flows that are received by hypervisor h is expressed as follows:

$$T_h^{Rx} = \sum_{i \in V \setminus V_h, j \in V_h} f_{ij}, \text{ for any } h \in H. \quad (13)$$

The aggregate throughput of all flows in a data center becomes:

$$T = \sum_{h \in H} T_h^{Rx}. \quad (14)$$

Different capacity regions, though they may render the same max aggregate system throughput, may not provide the same level of system performance. This will be illustrated using an example. An effective capacity is used to evaluate capacity regions, which is defined as:

$$C_{effective} = E[T] = \int_{F \in \Omega} T(F) g(F) dF, \quad (15)$$

where T is the aggregate system throughput. The effective capacity $C_{effective}$ is defined to be the expected value of T if T is considered to be a function of random flow matrix F with a density function g(F) across capacity region Ω. Note that T is actually a function of F in equations (13) and (14).

Without loss of generality, the density function g(F) can be assumed to be a constant D. Then the term $C_{effective}$ can be further simplified as:

$$C_{effective} = D \int_{F \in \Omega} T(F) dF \quad (16)$$

For ease of Monte-Carlo sampling based simulation, equation (16) can be approximated to the following by translating the integral to a summation across uniformly distributed samples in Ω.

$$C_{effective} \approx \frac{1}{n_{sample}} \sum_{i=1}^{n_{sample}} T_i^{sample} \quad (17)$$

Balance impact of queue hashing on the effective capacity can be demonstrated using a simple example with two cases. In the first case, flows $f_1$, $f_2$, $f_3$, $f_4$ are balanced hashed to two Rx queues. In the second case, flow $f_1$ is hashed to one Rx queue and other three flows are hashed to the other Rx queue. In both cases, the max aggregate system throughput is 2×$C_{Rx\text{-}CPU}$. Note that $C_{Rx\text{-}CPU}$ corresponds to processable rate on a Rx CPU core, which is 2.5 Gbps in the test setup described above. Now, the effective capacity of the capacity regions induced by the two cases are evaluated.

Case 1 (Balanced):

$$C_{effective}^{balanced} = \qquad (18)$$

$$\frac{4}{C_{Rx\text{-}CPU}^4} \int_{f_1+f_2<C_{Rx\text{-}CPU}, f_3+f_4<C_{Rx\text{-}CPU}} \left(\sum_{i=1}^{4} f_i\right) df_1 df_2 df_3 df_4 =$$

$$\frac{4}{3} C_{Rx\text{-}CPU}$$

Case 2 (Unbalanced):

$$C_{effective}^{unbalanced} = \qquad (19)$$

$$\frac{6}{C_{Rx\text{-}CPU}^4} \int_{f_1<C_{Rx\text{-}CPU}, f_2+f_3+f_4<C_{Rx\text{-}CPU}} \left(\sum_{i=1}^{4} f_i\right) df_1 df_2 df_3 df_4 =$$

$$\frac{5}{4} C_{Rx\text{-}CPU}$$

As shown above, the balanced case gives higher effective capacity than the unbalanced case. This matches common sense since an unbalanced flow distribution in general imposes a more stringent constraint on growth of flow rates than a balanced flow distribution. This also validates the definition of the effective capacity.

The performance analyzer 106 is designed to take advantage of the concept of capacity regions and/or the concept of effective capacity to characterize the performance of the datacenter 100 with respect to data traffic throughput. Using one or both of these concepts, the performance analyzer is able to provide useful information to users of the datacenter with respect to data traffic throughput performance.

Figure 8:
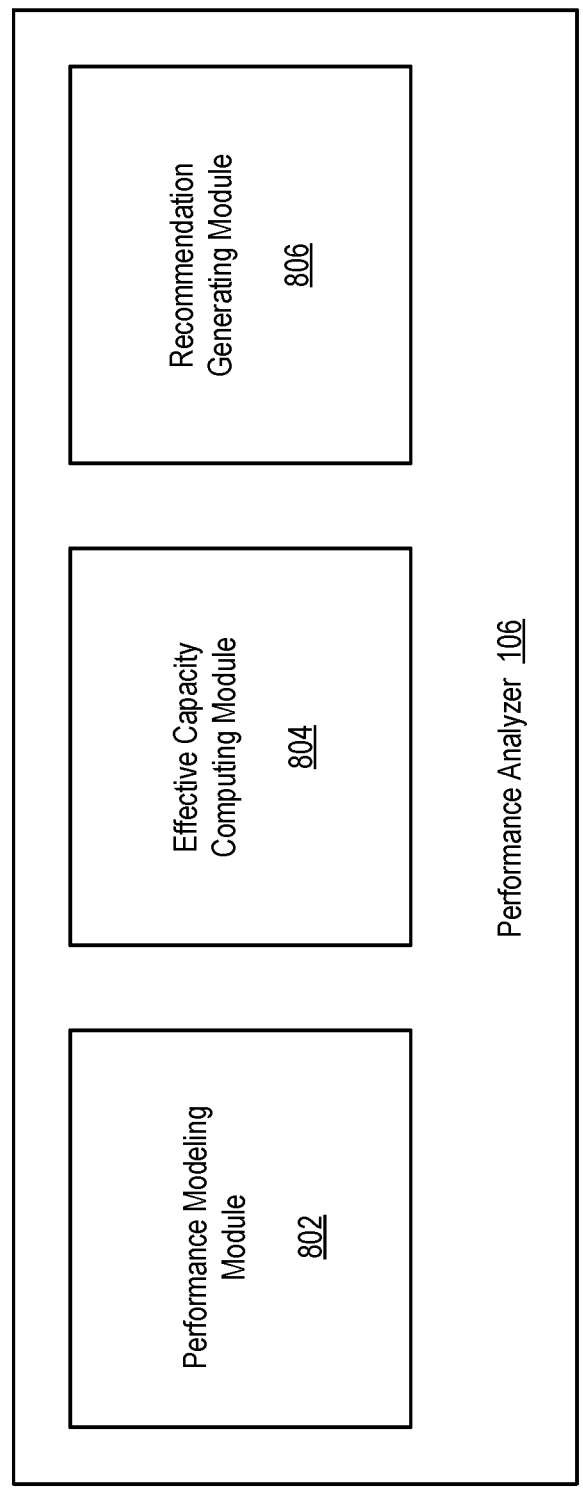
FIG. 8 is a block diagram of components of a performance analyzer in accordance with an embodiment of the invention.

Turning now to FIG. 8, components of the performance analyzer 106 in accordance with an embodiment of the invention are illustrated. As shown in FIG. 8, the performance analyzer 106 includes a performance modeling module 802, an effective capacity computing module 804 and a recommendation generating module 806. These components of the performance analyzer 106 may be implemented in any combination of hardware, software and firmware. In some implementations, these components of the performance analyzer 106 are implemented as one or more software programs running on one or more physical computer systems using one or more processors associated with the physical computer systems.

The performance modeling module 802 is configured or programmed to define the capacity region for the datacenter 100 using the constraints defined by the inequalities (7)-(12). In an embodiment, the performance modeling module 802 computes the constraints defined by the inequalities (7)-(10). In order to compute these constraints, the performance modeling module 802 retrieve information regarding VMs and hypervisors running in the datacenter 100 and the specification of PNICs in the hosts in the datacenter, which specifies bandwidth of the PNICs. This information may be retrieved from the logical network manager 104 or some other component in the datacenter 100, which has the needed information. In an embodiment, the performance modeling module 802 may query that component to retrieve the needed information.

In addition, the performance modeling module 802 executes benchmark testing on the datacenter 100 to determine the best possible Tx-side CPU processable throughput on a single core for traffic between unique pairs of VMs in the datacenter, i.e., $C_{ij}^{Tx\text{-}CPU}$, and the best possible Rx-side CPU processable throughput on a single core for traffic between unique pairs of VMs in the datacenter, i.e., $C_{ij}^{Rx\text{-}CPU}$. The benchmark testing may involve monitoring the actual throughput for test traffic between various VMs and may initiate testing traffic in order to obtain the benchmark measures. In an embodiment, the performance modeling module 802 may perform the benchmark testing. In other embodiments, the performance modeling module may call a function or routine, which performs the benchmark testing on the datacenter.

Using the benchmark testing results and the bandwidth of the PNICs in the datacenter, the performance modeling module 802 computes the constraints defined by the inequalities (7)-(10). The information contained in these inequalities define the capacity region for all flows in the datacenter 100, which provides valuable throughput insight for the datacenter. Using the information contained in these inequalities, hardware and/or software in the datacenter 100 may be modified with respect to configuration or amount to create a better capacity region for the datacenter. In some extreme cases, hardware components of the datacenter 100 may be upgraded to create a better capacity region for the datacenter.

The effective capacity computing module 804 is configured or programmed to compute the effective capacity for the datacenter 100. In an embodiment, the effective capacity computing module 804 computes an effective capacity value defined by the approximate equation (17) using Monte-Carlo sampling based simulation. The Monte-Carlo sampling is used to convert the calculation of integral to the summation and average of the sample points, for the ease of computer operations. The derived effective capacity value is a measure of flow balance in a datacenter. In an embodiment, the effective capacity value is such that higher value indicates a more balanced system. In some embodiments, the effective capacity computing module 804 may present the effective capacity value with notations regarding correlation between effective capacity values and balanced conditions of the datacenter.

The recommendation generating module 806 is configured or programmed to provide suggestions to modify the capacity region for the datacenter 100 to create a better capacity region for the system. The shape and the size of the capacity region are regulated by a set of resource allocation schemes, such as threading model on flow processing, queue hashing mechanisms (Tx and Rx) and thread scheduling mechanism across CPU cores, given the same collection of hardware utilities. The recommendation generating module 806 may provide suggestions regarding one or more resource allocation schemes to modify the capacity region for the datacenter. In an embodiment, the recommendation generating module 806 may suggest balanced queue hashing mechanisms for Tx and/or Rx when the effective capacity value computed by the effective capacity computing module 804 is below a certain threshold. In some embodiments, the recommendation generating module 806 may provide suggestions for one or more resource allocation schemes in response to user input regarding the desired size and/or shape of the capacity region for the datacenter 100.

Figure 9:
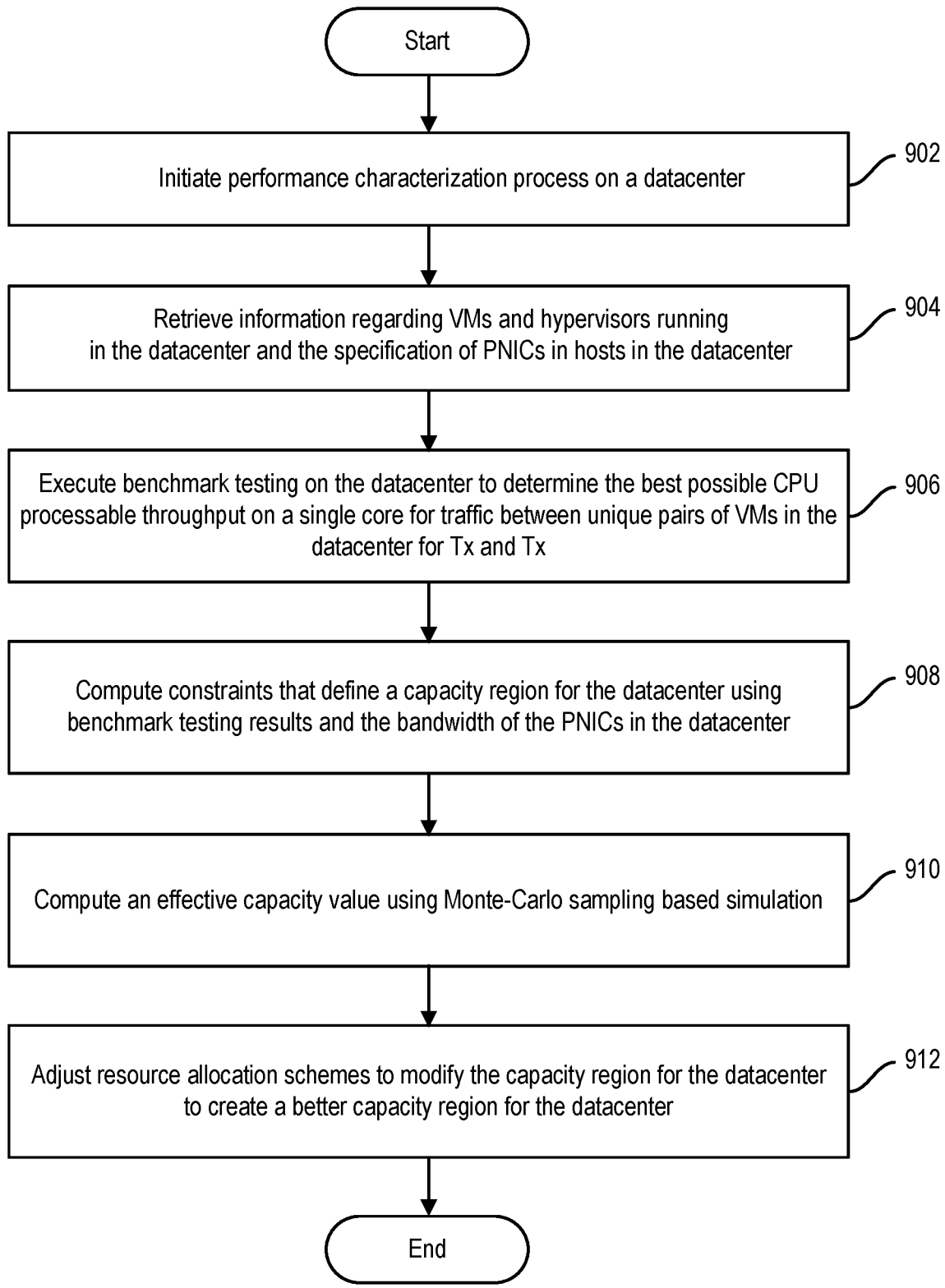
FIG. 9 is a flow diagram of an operation of the performance analyzer in accordance with an embodiment of the invention.

The operation of the performance analyzer 106 in accordance with an embodiment of the invention is described with reference to a flow diagram of FIG. 9. The operation begins at block 902, where a performance characterization process on the datacenter 100 is initiated. In an embodiment, the process is initiated in response to user input using, for example, a management user interface, which may be running on the logical network manager 104.

Next, at block 904, information regarding VMs and hypervisors running in datacenter and the specification of PNICs in hosts in the datacenter is retrieved by the performance modeling module 802 of the performance analyzer 106. The specification of the PNICs specifies the bandwidth of the PNICs.

Next, at block 906, benchmark testing is executed on the datacenter 100 by the performance modeling module 802 to determine the best possible Tx-side CPU processable throughput on a single core for traffic between unique pairs of VMs in the datacenter and the best possible Rx-side CPU processable throughput on a single core for traffic between unique pairs of VMs in the datacenter.

Next, at block 908, constraints that define a capacity region for the datacenter 100 are computed by the performance modeling module 802 using benchmark testing results and the bandwidth of the PNICs in the datacenter. One of these constraints may specify that the rates of flows processed by the same core on Tx side are limited by the processing capability of the core, and thus, cannot exceed 100%. Another of these constraints may specify that the aggregate rate of flows that are sent out of a PNIC cannot exceed the PNIC's Tx bandwidth. Another of these constraints may specify that the aggregate rate of flows that are received by a PNIC can not exceed the PNIC's Rx bandwidth. Another of these constraints may specify that the summation of CPU shares taken by different flows processed by the same core on Rx side are limited by the processing capability of the core, and thus, cannot exceed 100%. In a particular implementation, four constraints are computed, which are inequalities (7)-(10). These constraints may be presented to the user so that the user can take advantage of the information contained in the constraints.

Next, at block 910, an effective capacity value is computed by the effective capacity computing module 804 of the performance analyzer 106. The effective capacity is defined to be the expected value of the aggregate system throughput if the aggregate system throughput is considered to be a function of random flow matrix F with a density function g(F) across the capacity region. In an embodiment, the density function may be assumed to be a constant to simplify the calculation. In a particular implementation, the effective capacity value may be approximated using using Monte-Carlo sampling based simulation. The derived effective capacity value may be presented to the user so that the user can appreciate the flow balance of the datacenter 100.

Next, at block 912, resource allocation schemes are adjusted in the datacenter 100 by the recommendation generating module 806 of the performance analyzer 106 to modify the capacity region for the datacenter to create a better capacity region for the datacenter. In an embodiment, the adjustment may involve changing queue hashing mechanisms for Tx and/or Rx based on the effective capacity value. In other embodiments, the adjustment for changes in resource allocation schemes may be in response to user input for particular size and/or shape of the capacity region for the datacenter 100 so that desired throughput characteristics of the datacenter can be achieved to improve throughput performance of the datacenter.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for characterizing throughput performance of a datacenter having a plurality of host computers connected to a physical network, the method comprising:
   retrieving bandwidth information of physical network interfaces in the datacenter;
   executing benchmark testing on the datacenter to determine a processor processable throughput on a single processor core for data traffic between virtual processing instances in the datacenter;
   computing a plurality of throughput constraints that define a throughput capacity region for the datacenter using the bandwidth information of the physical network interfaces and the determined processor processable throughput on the single processor core; and adjusting resource allocation schemes in the datacenter to modify the throughput capacity region for the datacenter to improve the throughput performance of the datacenter.

2. The method of claim 1, wherein computing the plurality of throughput constraints includes computing at least one constraint that specifies that rates of flows processed by the same processing core on one of transmit side and receive side are limited by a processing capability of that processor core.

3. The method of claim 2, wherein computing the at least one constraint includes computing an inequality that states that a summation of processor shares by all flows in the datacenter that are processed by a processor core on a transmit or receive side of a hypervisor is equal to or less than 1, for any transmit or receive queue that is mapped to the processor core and any hypervisor.

4. The method of claim 1, wherein computing the plurality of throughput constraints includes computing at least one constraint that specifies that an aggregate rate of flows that are sent out of or received by a physical network interface cannot exceed the bandwidth of the physical network interface.

5. The method of claim 4, wherein computing the at least one constraint includes computing an inequality that states that a summation, across all transmit or receive queues that are mapped to processor cores, of rates of all transmitted or received flows that are processed and mapped to a transmit or receive queue, is equal to or less than the bandwidth of a network interface on transmit side or receive side of any hypervisor.

6. The method of claim 1, wherein executing the benchmark testing on the datacenter includes executing the benchmark testing on the datacenter to determine a best possible transmit-side processor processable throughput on a single processor core for data traffic between virtual processing instances in the datacenter and a best possible receive-side processor processable throughput on a single processor core for data traffic between virtual processing instances in the datacenter.

7. The method of claim 1, further comprising computing an effective capacity value, wherein the effective capacity is defined to be an expected value of an aggregate system throughput of all flows through the datacenter if the aggregate system throughput is considered to be a function of random flow matrix F with a density function g(F) across the capacity region.

8. The method of claim 1, further comprising providing suggestions for resource allocation schemes to modify the throughput capacity region of the datacenter.

9. A non-transitory computer-readable storage medium containing program instructions for characterizing throughput performance of a datacenter having a plurality of host computers connected to a physical network, wherein execution of the program instructions by one or more processors of a computer system causes the one or more processors to perform steps comprising:
retrieving bandwidth information of physical network interfaces in the datacenter;
executing benchmark testing on the datacenter to determine a processor processable throughput on a single processor core for data traffic between virtual processing instances in the datacenter;
computing a plurality of throughput constraints that define a throughput capacity region for the datacenter using the bandwidth information of the physical network interfaces and the determined processor processable throughput on the single processor core; and
adjusting resource allocation schemes in the datacenter to modify the throughput capacity region for the datacenter to improve the throughput performance of the datacenter.

10. The computer-readable storage medium of claim 9, wherein computing the plurality of throughput constraints includes computing at least one constraint that specifies that rates of flows processed by the same processing core on one of transmit side and receive side are limited by a processing capability of that processor core.

11. The computer-readable storage medium of claim 10, wherein computing the at least one constraint includes computing an inequality that states that a summation of processor shares by all flows in the datacenter that are processed by a processor core on a transmit or receive side of a hypervisor is equal to or less than 1, for any transmit or receive queue that is mapped to the processor core and any hypervisor.

12. The computer-readable storage medium of claim 9, wherein computing the plurality of throughput constraints includes computing at least one constraint that specifies that an aggregate rate of flows that are sent out of or received by a physical network interface cannot exceed the bandwidth of the physical network interface.

13. The computer-readable storage medium of claim 12, wherein computing the at least one constraint includes computing an inequality that states that a summation, across all transmit or receive queues that are mapped to processor cores, of rates of all transmitted or received flows that are processed and mapped to a transmit or receive queue, is equal to or less than the bandwidth of a network interface on transmit side or receive side of any hypervisor.

14. The computer-readable storage medium of claim 9, wherein executing the benchmark testing on the datacenter includes executing the benchmark testing on the datacenter to determine a best possible transmit-side processor processable throughput on a single processor core for data traffic between virtual processing instances in the datacenter and a best possible receive-side processor processable throughput on a single processor core for data traffic between virtual processing instances in the datacenter.

15. The computer-readable storage medium of claim 9, wherein the steps further comprise computing an effective capacity value, wherein the effective capacity is defined to be an expected value of an aggregate system throughput of all flows through the datacenter if the aggregate system throughput is considered to be a function of random flow matrix F with a density function g(F) across the capacity region.

16. The computer-readable storage medium of claim 9, wherein the steps further comprise providing suggestions for resource allocation schemes to modify the throughput capacity region of the datacenter.

17. A computer system comprising:
memory; and
a processor configured to:
retrieve bandwidth information of physical network interfaces in a datacenter;
execute benchmark testing on the datacenter to determine a processor processable throughput on a single processor core for data traffic between virtual processing instances in the datacenter;
compute a plurality of throughput constraints that define a throughput capacity region for the datacenter using the bandwidth information of the physical network interfaces and the determined processor processable throughput on the single processor core; and adjust resource allocation schemes in the datacenter to modify the throughput capacity region for the datacenter to improve throughput performance of the datacenter.

18. The computer system of claim 17, wherein the processor is configured to compute at least one constraint that specifies that rates of flows processed by the same processing core on one of transmit side and receive side are limited by a processing capability of that processor core.

19. The computer system of claim 17, wherein the processor is configured to compute at least one constraint that specifies that an aggregate rate of flows that are sent out of or received by a physical network interface cannot exceed the bandwidth of the physical network interface.

20. The computer system of claim 17, wherein the processor is further configured to compute an effective capacity value, wherein the effective capacity is defined to be an expected value of an aggregate system throughput of all flows through the datacenter if the aggregate system throughput is considered to be a function of random flow matrix F with a density function g(F) across the capacity region.

* * * * *